US008612568B2

(12) United States Patent
Tian

(10) Patent No.: US 8,612,568 B2
(45) Date of Patent: Dec. 17, 2013

(54) METHOD, SYSTEM AND NETWORK SERVER FOR RECORDING USE OF NETWORK SERVICE CAPABILITY BY APPLICATIONS

(75) Inventor: Linyi Tian, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1765 days.

(21) Appl. No.: 11/449,598

(22) Filed: Jun. 9, 2006

(65) Prior Publication Data
US 2006/0282515 A1    Dec. 14, 2006

(30) Foreign Application Priority Data

Jun. 9, 2005  (CN) .......................... 2005 1 0076965

(51) Int. Cl.
| | | |
|---|---|---|
| G06F 15/173 | (2006.01) | |
| G06F 15/16 | (2006.01) | |
| H04L 12/26 | (2006.01) | |
| H04L 12/66 | (2006.01) | |
| H04L 12/56 | (2011.01) | |
| H04L 12/28 | (2006.01) | |
| H04M 1/64 | (2006.01) | |
| H04M 11/00 | (2006.01) | |
| H04M 3/42 | (2006.01) | |
| H04M 7/00 | (2006.01) | |

(52) U.S. Cl.
USPC ........... 709/224; 709/202; 709/223; 709/226; 370/252; 370/352; 370/356; 370/389; 370/392; 370/400; 370/401; 379/88.17; 379/93.01; 379/201.01; 379/221.08

(58) Field of Classification Search
USPC .......... 709/202, 223, 224, 226; 370/252, 352, 370/353, 356, 389, 392, 400, 401; 379/88.17, 93.01, 201.01, 221.08
See application file for complete search history.

(56) References Cited

U.S. PATENT DOCUMENTS

| | | | | |
|---|---|---|---|---|
| 5,867,494 | A * | 2/1999 | Krishnaswamy et al. | 370/352 |
| 5,999,525 | A * | 12/1999 | Krishnaswamy et al. | 370/352 |
| 6,731,625 | B1 * | 5/2004 | Eastep et al. | 370/352 |
| 6,779,030 | B1 * | 8/2004 | Dugan et al. | 709/223 |
| 6,909,708 | B1 * | 6/2005 | Krishnaswamy et al. | 370/352 |
| 7,145,898 | B1 * | 12/2006 | Elliott | 370/352 |
| 7,209,964 | B2 * | 4/2007 | Dugan et al. | 709/223 |
| 7,869,425 | B2 * | 1/2011 | Elliott et al. | 370/352 |
| 2002/0064149 | A1 * | 5/2002 | Elliott et al. | 370/352 |
| 2005/0021713 | A1 * | 1/2005 | Dugan et al. | 709/223 |
| 2008/0095339 | A1 * | 4/2008 | Elliott et al. | 379/93.01 |
| 2009/0109959 | A1 * | 4/2009 | Elliott et al. | 370/352 |

* cited by examiner

*Primary Examiner* — David Lazaro
*Assistant Examiner* — Vitali Korobov

(57) ABSTRACT

The present invention discloses method, system and network server for recording use of network service capability by applications (APPs), and the key points of the methods comprise: a network server acquires an identity of the APP and type information of the network service capability providing services for the APP, conducts service logic processing, and writes a message of use of network service capability, which comprises at least the identity of the APP and the type information of the network service capability providing services for the APP. With the methods of this invention, the purpose of making effective records of use of network service capability by APPs provided by service providers is implemented. Furthermore, management of APPs, such as charging, may be conducted by utilizing the records.

13 Claims, 9 Drawing Sheets

METHOD, SYSTEM AND NETWORK SERVER FOR RECORDING USE OF NETWORK SERVICE CAPABILITY BY APPLICATIONS

CROSS-REFERENCE TO RELATED APPLICATIONS

This application claims priority to Chinese Patent Application No. 200510076965.X, filed Jun. 9, 2005, all of the disclosure of which is hereby incorporated by reference in its entirety.

FIELD OF THE INVENTION

The present invention relates to network management techniques, and in particular, to method, system and network server for recording use of network service capability by applications provided by service providers.

BACKGROUND OF THE INVENTION.

Along with the fast development of the communication technology and the Internet, merging of the fixed networks, the mobile networks and the Internet has become a general trend, and demands for network services are gradually becoming diversified, integrated, and individualized. Under these circumstances, an open next-generation network architecture is progressively taking shape, which can merge networks of various different structures and comprehensively provide multimedia services.

The fundamental purpose of developing the networks is to provide people with plenty of services, and the service evolvements are driving forces of the fast development of the next-generation networks (NGN). In order to realize merging of the service-layers, a certain approach is required, e.g., universal network interfaces, to shield technical details of the bottom-layers of different networks, so that the upper-layer service applications would have nothing to do with specific network structures, and services across networks of various different structures could be implemented in a uniform way.

The infrastructure of a network is provided by a network service provider, which is the running basis of practical applications provided by a service provider, such as a network operator, a virtual operator, or a third-party service provider. With the development of technology, it is possible to adopt a uniform set of interfaces for abstractly representing service capability of the network, and provide them to the service provider so as to mask discrepancies of the networks and make the networks transparent to the applications (APPs) provided by the service provider, and thus, the applications could uniformly use the capability of the merged network. A representative example herein is a Parlay/OSA Application Programming Interface (API) architecture, including Parlay X Web Services, which defines a set of open interfaces independent of specific techniques and networks, and introduces an application developing mode of the Internet, thereby providing a technical foundation for the merging of IT applications with telecommunication networks. So far, the Parlay/OSA API has won support from numerous standardization organizations and manufacturers, and has become a standard of open network API oriented to Next Generation Networks.

With gradual opening-up of the networks and extensive use of such techniques as interface technique, an issue of how to manage the service providers becomes increasingly prominent. As there is no record for the use of network service capability by applications provided by a service provider in the prior art, it is impossible to conduct management such as charging and performing statistics based on the use of network service capability by the applications provided by the service provider.

In the existing fixed networks, mobile networks, and Internet, there are records of information such as time duration, flow volume, and terminal addresses for users when they consume services, and management could be carried out in connection with these records. Below is a brief description of the structure of the network system in the prior art by taking a system for charging as an example.

FIG. 1 is a schematic diagram illustrating the network architecture in the prior art of implementing charging for users. Typically, the network system comprises an APP 110 provided by a service provider, a network server 120 including a logic processing module 121 and a network operation processing module 122, and one or more network function performing module 130. In order to acquire call detail records (CDR) for charging, the network system further comprises a subscriber CDR processing module 140 as well as a subscriber CDR recording module 123 set in the network server 120.

Here, the APP 110 is for initiating an invocation request to the logic processing module 121 in the network server, where the request contains an identity of the APP 110 itself and invocation parameters; or for receiving performing results from the logic processing module 121 in the network server.

The logic processing module 121 functions to obtain the identity of the APP 110 and the invocation parameters from the received invocation request, and after validating the invocation parameters in the request are appropriate, determine type information of the network service capability providing services to the APP 110 according to the received invocation request, and send a network operating command to the network operation processing module 122, or receive the processing result of network operations from the network operation processing module 122.

The network operation processing module 122 is responsible for analyzing the network operating command received from the logic processing module 121, sending the analyzed command to the corresponding network function performing module 130, analyzing the processing result of network operations received from the network function performing module 130, and returning the analyzed result to the logic processing module 121.

The network function performing module 130 is adopted to perform network operations in accordance with the received command.

The subscriber CDR recording module 123 is in use for receiving the statistical information from the network operation processing module 122, which includes time duration and/or flow volume as well as terminal addresses, recording the received information, and sending the recorded information to the subscriber CDR processing module.

The subscriber CDR processing module 140 takes charge of pricing the received statistical information in accordance with a pre-configured charging matrix of a subscriber's CDR, and generating an account bill for the subscriber.

For the system as shown in FIG. 1, it is possible for the network side to actively initiate a notifying message without subscription by the APP. In this case, the network function performing module 130 is further used for submitting information of a network event to the network operation processing module 122 when a preset triggering condition of the network-side initiative operation is met.

The network operation processing module 122 is further used for analyzing the received information of the network event before submitting the analyzed information to the logic processing module 121.

The logic processing module 121 is further used for, based on the received information of the network event and a preset corresponding relation between the network event and an identity of the APP, obtaining the identity of the APP corresponding to the received network event and type information of the network service capability providing services for the APP, and sending a notifying message to the APP 110.

Whichever processing is made at the network side, the network side will only perform charging for user equipments (UE). Charging for the UEs is mainly implemented by means of statistics of time duration and/or flow volume according to the recorded terminal addresses or other identifiers of the terminals. These recording methods, however, are not applicable for recording and managing applications provided by service providers, for it is quite possible that the time durations or flow volumes consumed by the applications of the service providers are the same or nearly the same, while it doesn't indicate that the occupied network resources of the applications are the same. Therefore, how to make effective records of different network resources occupied by different service providers and amount of the resources used, i.e., use of network service capability by the APPs, remains an issue to be solved.

SUMMARY OF THE INVENTION

In view of the above, in one aspect, this invention provides a method for recording use of network service capability by APPs so as to make effective records of the network service capability used by the APPs provided by service providers. Meanwhile, in another aspect, this invention provides a method for recording use of network service capability in connection with a notifying invocation request. In yet another aspect, this invention provides two systems and a network server for recording use of network service capability by APPs so as to implement the above methods.

A method for recording use of network service capability by an application (APP), comprising the steps of:

initiating by the APP an invocation request containing an identity of the APP and invocation parameters to a network server;

obtaining by the network server the identity of the APP and type information of the network service capability requested by the APP from the received invocation request;

recording by the network server a message of use of network service capability, which at least comprises the identity of the APP and the type information of the network service capability providing services for the APP.

The method further comprises:

configuring a charging matrix of use of network service capability; and sending by the network server a list of use of network service capability which records multiple messages of use of network service capability to a pre-configured network usage list processing module, and the network usage list processing module pricing the received list of use of network service capability according to the acquired charging matrix of use of network service capability, and producing a charging account for the APP.

Said list of use of network service capability is in a form of a file or a database, and said network usage list processing module obtains the list of use of network service capability by way of FTP or reading the database.

A method for recording use of network service capability, comprising the steps of:

configuring triggering conditions, which are determined according to functions of the network side, for the network side to initiatively send a notifying message to an APP; and when a triggering condition of the APP is currently met, obtaining the identity of the APP corresponding to the received network event as well as type information of the network service capability providing services for the APP based on a pre-configured corresponding relation between a network event and an identity of the APP, performing service logic processing, invoking a notifying interface of the APP, sending a notifying message to the APP, and recording a message of use of network service capability by the network server;

said message of use of network service capability at least comprises the identity of the APP and the type information of the network service capability providing services for the APP.

A system for recording use of network service capability by an APP, comprising:

an application (APP), a network server including a logic processing module and a network operation processing module, and one or more network function performing module, said network server also includes a network usage recording module, wherein said APP is for initiating an invocation request to the logic processing module in the network server, where the invocation request contains an identity of the APP and invocation parameters; or for receiving a performing result from the logic processing module in the network server;

said logic processing module is for obtaining the identity of the APP and the invocation parameters from the received invocation request, determining the type information of the network service capability providing services for the APP according to the received invocation request after deciding the invocation parameters in the request are legitimate, and sending network operating commands to the network operation processing module or receiving the processing result of network operation from the network operation processing module; or sending to the network usage recording module the obtained identity of the APP initiating the request and the type information of the network service capability providing services for the APP;

said network operation processing module is for analyzing the network operating command received from the logic processing module, sending the analyzed command to the network function performing module corresponding to the command, and analyzing the processing result of network operation returned from the network function performing module before returning the analyzed result to the logic processing module;

said network function performing module is for implementing network operation in accordance with the received command;

said network usage recording module is for recording, based on the received information, a message of use of network service capability, which at least comprises an identity of the APP and type information of the network service capability providing services for the APP.

A system for recording use of network service capability by an APP, comprising an application (APP), a network server including a logic processing module and a network operation processing module, a network function performing module, wherein a network usage recording module is included in the network server, and said network function performing module is for submitting information of a network event to the network operation processing module in the network server when a pre-configured triggering condition of initiatively informing by the network side is met;

said network operation processing module is for analyzing the received information of the network event before submitting the analyzed information to the logic processing module in the network server; or for analyzing the network operating command received from the logic processing module, sending the analyzed command to the network function performing module corresponding to the command, and analyzing the processing result of network operation received from the network function performing module before returning the result to the logic processing module;

said logic processing module is for, according to the received information of the network event as well as a pre-configured corresponding relation between the network event and the identity of the APP, acquiring the identity of the APP corresponding to the received network event and the type information of the network service capability providing services for the APP, or sending the network operating command to the network operation processing module, or sending a notifying message to the APP according to the processing result of network operation returned from the network function performing module, or sending the acquired information to the network usage recording module;

said application (APP) is for receiving the notifying message from the logic processing module;

said network usage recording module is for recording a message of use of network service capability, which at least comprises an identity of the APP and type information of the network service capability providing services for the APP.

A network server for recording use of network service capability by an APP, comprising: a logic processing module, a network operation processing module and a network usage recording module, wherein said logic processing module is for obtaining the identity of the APP and the invocation parameters from a received invocation request, determining the type information of the network service capability providing services for the APP according to the received invocation request after deciding the invocation parameters in the request are legitimate, and sending network operating commands to the network operation processing module; or receiving the processing result of network operation from the network operation processing module; or sending to the network usage recording module the obtained identity of the APP initiating the request and the type information of the network service capability providing services for the APP; and said network operation processing module is for analyzing the network operating command received from the logic processing module, or analyzing the processing result of network operation before returning the analyzed result to the logic processing module; and said network usage recording module is for recording, based on the received information, a message of use of network service capability, which at least comprises an identity of the APP and type information of the network service capability providing services for the APP.

The present invention provides two methods for recording the use of network service capability by APPs, of which the key points are that a network server acquires information of a basic attribute of an APP and type information of the network service capability providing services for the APP, implements service logic processing, and then generates a message of use of network service capability, which at least comprises a serial number of this message, an identity of the APP, type information of the network service capability, and an end mark of the message. With the method of the present invention, the purpose of effectively recording the use of network service capability by APPs provided by service providers is realized. In addition, the records can be used to carry out further management for the APPs, e.g., charging. As a result, it is possible to charge an APP based on its use of network service capability, which is fair for the public. Furthermore, as charging for APPs is realized, new benefits are brought to network service providers, which compensate construction cost of network infrastructures.

At the same time, the present invention provides two systems and a network server for recording the use of network service capability by APPs, which facilitates implementation of the above methods.

EMBODIMENTS OF THE INVENTION

This invention is hereinafter described further in detail with reference to the accompanying drawings and specific embodiments.

The idea of this invention is: to record use of network service capability by APPs. In this way, it is possible to carry out management such as charging and statistics for the APPs in a more purposeful way.

The so called network service capability refers to capability abstracted from a certain network service provided by a network server, e.g., call routing, call supervising, voice playing, acquiring more in-coming numbers, adding members to a group, sending a text message, sending a multimedia message, acquiring location information of a terminal, submitting a location change for a terminal, sending a USSD message, deducting cost according to amount, reserving cost according to amount, and prolonging time of cost reservation. Each network service may be discerned as a kind of network service capability. Use the above network services once by an APP would be considered as one use of network service capability by the APP.

It is well known that an APP may use the capability of a network-side server synchronously or asynchronously, or it can use notifying capability of a network-side server, either. The implementation of the present invention is described hereinafter with reference to the above three application circumstances.

Figure 1:
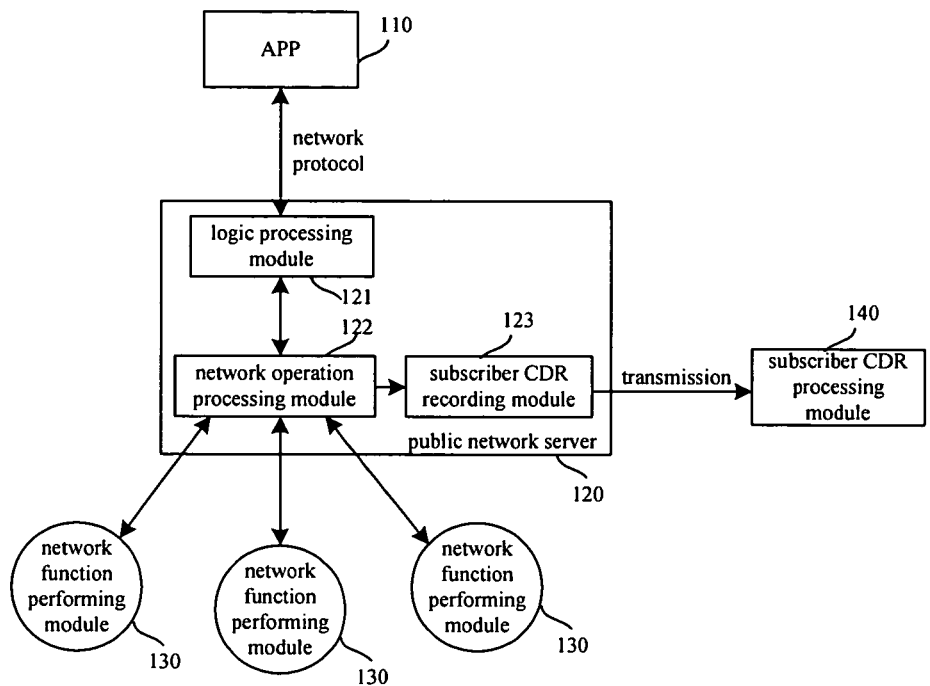
FIG. 1 is a schematic diagram illustrating the structure of a network system implementing charging for users in the prior art.
Figure 2A:
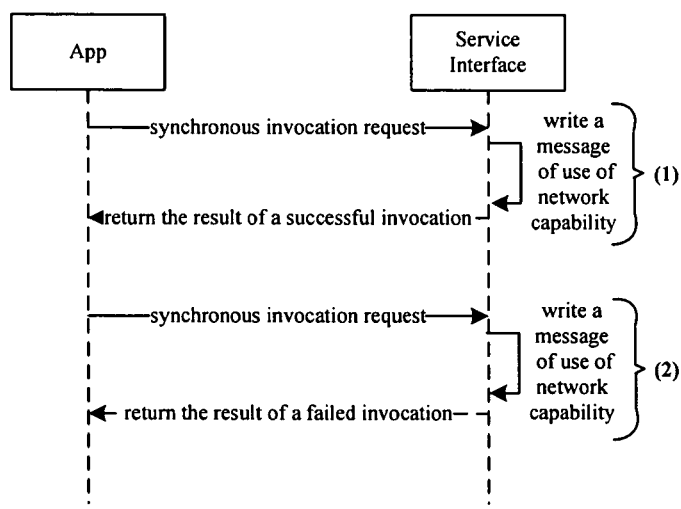
FIG. 2a is a schematic diagram illustrating an implementation of recording synchronous use of network service capability of network-side servers according to an embodiment of the present invention.
Figure 2B:
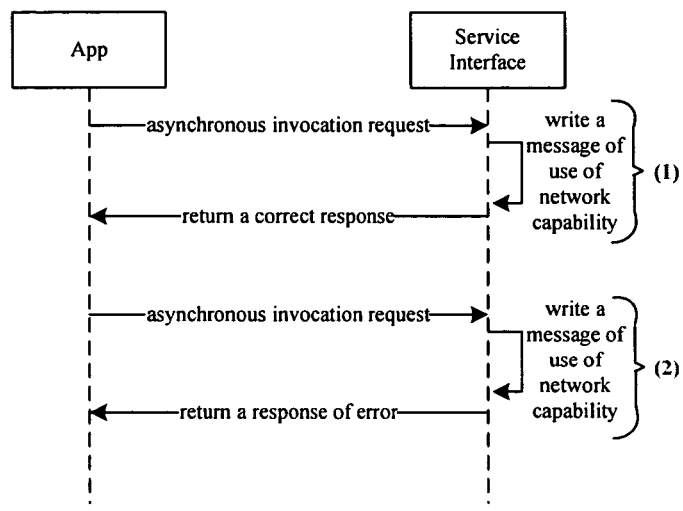
FIG. 2b is a schematic diagram illustrating an implementation of recording asynchronous use of network service capability of network-side servers according to an embodiment of the present invention.
Figure 2C:
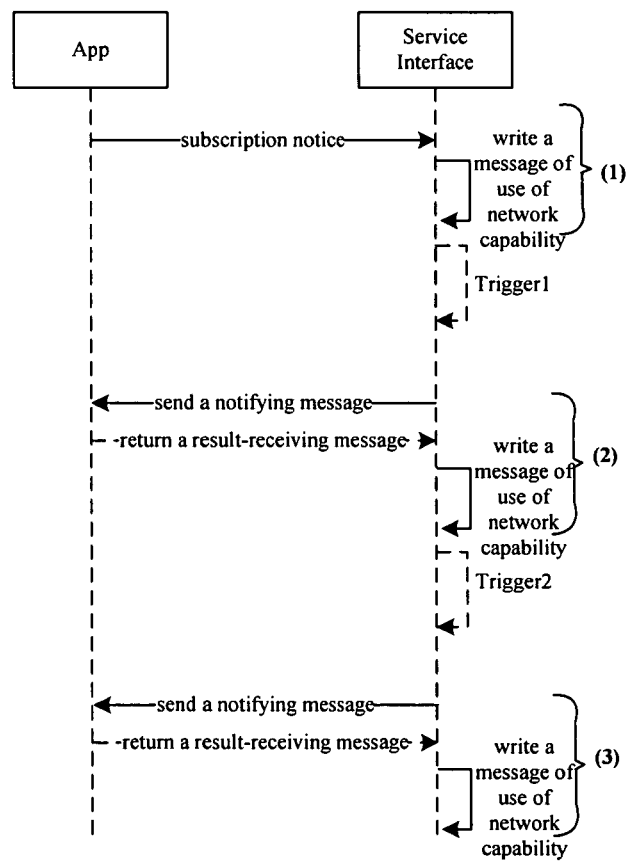
FIG. 2c is a schematic diagram illustrating an implementation of recording use of notifying capability of network-side servers according to an embodiment of the present invention.

FIGS. 2a, 2b & 2c are schematics illustrating implementations of recording the use of network service capability by APPs under three application circumstances. FIG. 2a is a schematic illustrating an implementation of recording synchronous use of capability of network-side servers according to an embodiment of the present invention. After receiving a synchronous invocation request from an APP, a network server will implement service logic processing and generate a message for recording use of network service capability. Thereafter, the information of invocation result could be returned, or not returned to the APP by the network server. Both reference numbers (1) and (2) in FIG. 2a indicate a use of network service capability by the APP, where (1) represents a successful use of network service capability while (2) represents an unsuccessful use of network service capability.

FIG. 2b is a schematic diagram illustrating an implementation of recording asynchronous use of capability of network-side servers according to an embodiment of the present invention. After receiving an asynchronous invocation request from an APP, a network server will perform service logic processing and record a message of use of network service capability. Thereafter, the network server will invoke a callback interface of the APP and return the information of invocation result to the APP. Both reference numbers (1) and (2) in FIG. 2b indicate a use of network service capability by the APP, where (1) represents a successful use of network service capability while (2) represents an unsuccessful use of network service capability.

FIG. 2c is a schematic diagram illustrating an implementation of recording the use of notifying capability of network-side servers according to an embodiment of the present invention. After receiving a subscription notifying invocation request from an APP, a network server will carry out service logic processing and record a message of use of network service capability, where the subscription notifying invocation request is equal to a synchronous or asynchronous invocation request. In addition, once it is detected that a triggering condition required by this subscription is met, a notifying message is sent to the APP, and thereafter, a message of use of network service capability is recorded. After receiving the notifying message, the APP may return the receiving result to the network server, or not return the receiving result to the network server. Each of reference numbers (1), (2) and (3) in FIG. 2c indicates a use of network service capability by the APP, respectively, where (2) or (3) represents a use of network notifying capability, i.e., after the APP has appealed for a subscription once, the server will initiatively issue a notice as long as a triggering condition for issuing a notice by the network is currently satisfied, and a message of use of network service capability will be recorded after every issuance of notice.

Furthermore, there may be another circumstance for FIG. 2c, i.e., the APP has not conducted a subscription while the network side initiatively issues a notifying message. At this time, there is no scenario of (1) but only (2) and (3) in FIG. 2c.

Here, records for messages of use of network service capability triggered by an invocation request initiated by the APP or triggered by initiative of the network side may exist simultaneously or separately.

It is via an interface that the above APP initiates an invocation request to the network server, where the interface is a message communication interface, a file interface, or an API. Further, said message communication interface comprises a network protocol message interface, where a network protocol message is, but not limited to a TCP/IP message, an HTTP message, or an XML message. Moreover, said API-based invocation may comprise a local invocation or a remote invocation. The remote invocation could be in the form of Common Object Request Broker Architecture (Corba), or Web Service, or Remote Method Invocation (RMI)/Internet Inter-ORB Protocol (IIOP), or Distributed Component Object Model (DCOM).

The specific network system and implementing procedure in accordance with the present invention are hereinafter described, respectively.

Figure 3:
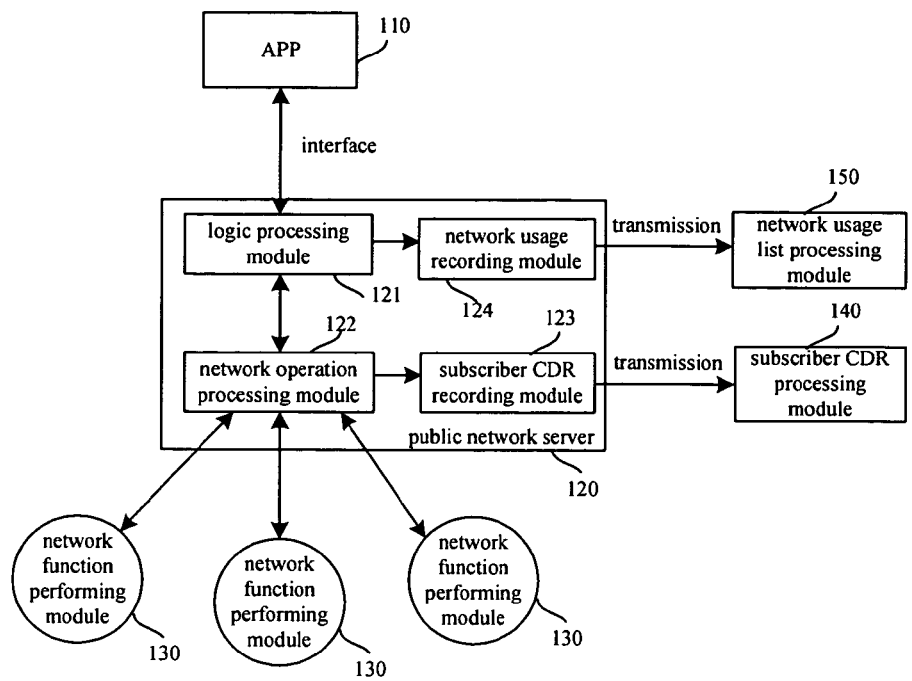
FIG. 3 is a schematic diagram illustrating a system structure for recording the use of network service capability by APPs in accordance with an embodiment of the present invention.

FIG. 3 is a schematic diagram illustrating system architecture for recording the use of network service capability by APPs in accordance with an embodiment of the present invention. This system comprises an APP 110, a network server 120 including a logic processing module 121 and a network operation processing module 122, a network function performing module 130, and a network usage recording module 124 is also included in the network server 120.

Here, the APP 110 is for initiating an invocation request to the logic processing module 121 in the network server, where the request contains an identity of the APP 110 itself and invocation parameters; or for receiving performing results from the logic processing module 121 in the network server.

The logic processing module 121 is for acquiring the identity of the APP 110 and the invocation parameters from the received invocation request, and after validating the invocation parameters in the request are appropriate, determining type information of the network service capability providing services to the APP 110 according to the received invocation request, and sending a network operating command to the network operation processing module 122, or receiving the processing result of network operation from the network operation processing module 122; or sending the acquired identity of the APP 110 initiating the request and the type information of the network service capability providing services for the APP 110 to the network usage recording module 124.

The network operation processing module 122 is for analyzing the network operating command received from the logic processing module 121, sending the analyzed command to the corresponding network function performing module 130, analyzing the processing result of network operation received from the network function performing module 130, and returning the analyzed result to the logic processing module 121.

The network function performing module 130 is for performing network operation in accordance with the received command.

The network usage recording module 124 is for recording, based on the received information, a message of use of network service capability, which may comprise an identity of the APP 110, and type information of the network service capability providing services for the APP 110. Further, the message of use of network service capability may comprise a serial number and an end mark, as well.

The above invocation request that the logic processing module 121 receives from the APP 110 is a synchronous invocation request, or an asynchronous invocation request, or a notifying invocation request based on interfaces. If the invocation request that the logic processing module 121 receives from the APP 110 is an asynchronous invocation request, after receiving the logic processing result from the network operation processing module 122, and acquiring state information on whether this service logic processing has successfully used the network service capability, the logic processing module 122 will callback the APP 110 and notify the APP 110 of the performing result.

If the invocation request that the logic processing module 121 receives from the APP 110 is a notifying invocation request, then the invocation request will further comprise information of a network event subscribed. The logic processing module 121, after deciding that a triggering condition required by the subscription is currently satisfied, will acquire the identity of the APP 110 initiating the request and the type information of the network service capability providing services to the APP, inform the network operation processing module 122 to operate the network, and invoke a notifying interface of the APP 110 after receiving the operation result of the network from the network operation processing module 122. After that, notify the APP 110 of the event subscribed, and write a record of use of network service capability again.

For the system as shown in FIG. 3, when the network side initiatively sends a notice, the relations among the APP 110, the network server 120 comprising the logic processing module 121 and the network operation processing module 122, the network function performing module 130, and the network usage recording module 124 included in the network server 120 are as follows:

The network function performing module 130 is for submitting the information of network event to the network operation processing module 122 within the network server when a pre-configured triggering condition for the network to initiate a notice is satisfied.

The network operation processing module 122 is for analyzing the received information of the network event before submitting the analyzed information to the logic processing module 121 within the network server; or for analyzing a network operating command received from the logic processing module 121, sending the analyzed command to the network function performing module 130 corresponding to the command, and analyzing the operation result of network received from the network function performing module 130 before returning the result to the logic processing module 121.

The logic processing module 121 is for, based on the received information of the network event and a pre-configured corresponding relation between the network event and an identity of the APP, acquiring the identity of the APP corresponding to the received network event and the type information of the network service capability providing services for the APP, or sending a network operating command to the network operation processing module 122 or sending a notifying message to the APP 110 according to the operation result of network returned from the network operation processing module 122 or sending the acquired information to the network usage recording module 124.

The APP 110 is for receiving the notifying message from the logic processing module.

The network usage recording module 124 is for use in the same operation as described above, and no further description is given here.

If it is desired to carry out charging management for the APP 110, whichever connecting mode is employed, the system as shown in FIG. 3 may further comprise a network usage list processing module 150, which receives a list of use of network service capability for recording multiple messages of use of network service capability from the network usage recording module 124, prices the list of use of network service capability according to a pre-configured charging matrix of use of network service capability, and produces a charging bill for the APP 110. In this pricing procedure, it is possible to price for each message of use of network service capability or a combination of multiple messages of use of network service capability, which depends on specific needs.

The above list of use of network service capability for recording multiple messages of use of network service capability is saved as a file or a database, and the network usage list processing module 150 acquires the list of use of network service capability by way of FTP or reading the database.

The above message of use of network service capability further comprises: an APP priority identifier, a QoS level identifier of the APP, one or more subscriber numbers, starting time and ending time of a request, an initiator ID and state information on whether a service logic processing has successfully used the network service capability.

When it is needed to charge according to a message of use of network service capability, the message of use of network service capability further comprises an identity of a charging mode and a current session identity, where the identity of the charging mode includes an identity of free charge, an identity of charging by pieces of message, or an identity of charging by monthly payment. Preferably, the identity of a charging mode could be configured in a changing matrix in stead of comprised in the message.

The message serial number is constituted jointly by submitting time of the message, a feature code of network service capability, and a serial number. The type information of the network service capability providing services for the APP comprises a serial number of the capability type and an interface type used by the APP, where the capability type comprises network service capability for voice services, network service capability for data services, or network service capability for management, and the type information of the network service capability providing services for the APP further comprises a serial number of a capability server.

Moreover, in the system as shown in FIG. 3, the existing portion of charging for terminals may remain unchanged. Thus, the system as shown in FIG. 3 may further comprise a subscriber CDR processing module 140 and a subscriber CDR recording module 123 inside the network server 120.

Here, the subscriber CDR recording module 123 is for receiving statistical information including time duration and/or flow volume as well as terminal addresses from the network operation processing module 122, recording the received information, and sending the recorded information to the subscriber CDR processing module 140.

The subscriber CDR processing module 140 is for pricing the received statistical information in accordance with a pre-configured charging matrix of a subscriber's CDR, and producing the subscriber's account bill.

Figure 4:
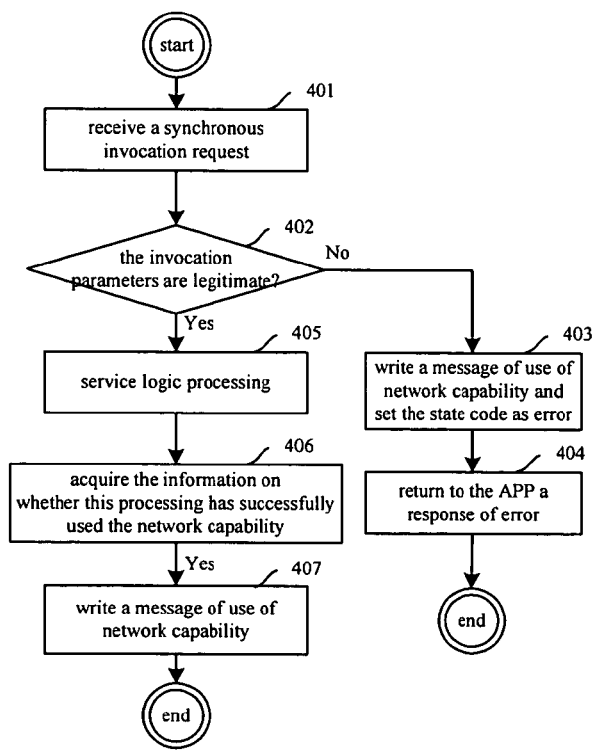
FIG. 4 is a flowchart for recording synchronous use of network service capability in accordance with an embodiment of the present invention.

FIG. 4 is a flowchart for recording synchronous use of network service capability in accordance with an embodiment of the present invention.

Step 401: A network server receives a synchronous invocation request from an APP, and the request comprises an identity of the APP and invocation parameters.

Step 402: The network server acquires the identity of the APP and invocation parameters from the invocation request, validates whether the invocation parameters are appropriate. If yes, perform Step 405; otherwise, perform Step 403.

Step 403: Write a message of use of network service capability which includes information representing the state that this service logic processing has failed to use the network service capability. The information representing the state that this service logic processing has failed to use the network service capability is identified by a state code, and the state code points out cause of failure, which hereby is that the invocation parameters are not appropriate.

Step 404: Return to the APP a message indicating an abnormal state of the APP, and end the procedure.

Step 405: Perform service logic processing. The specific procedure comprises: instructing the network function performing module which possesses network service capability corresponding to contents of the invocation request to implement network operation, and receiving a performing result returned from the network function performing module.

Step 406: Acquire state information on whether this service logic processing has successfully used the network service capability according to the performing result received.

Step 407: Write a message of use of network service capability, which contains the state information as this service logic processing has succeeded in using the network service capability, and end this procedure. Here, the state information on whether the service logic processing has successfully used the network service capability can be identified by a state code, which hereby is set for indicating success.

There are two methods for recording the state information on whether the service logic processing has successfully used the network service capability:

One is to decide whether the service logic processing is successful, if yes, record the state information as the service logic processing has succeeded in using the network service capability, otherwise, record the state information as the service logic processing has failed to use the network service capability; the other is to record the state information as the service logic processing has succeeded in using the network service capability as long as the service logic processing is finished, without considering whether the service logic processing is successful or not.

After executing the above Step 407, a step of sending to the APP the result of the invocation by the network server may be further comprised.

Figure 5:
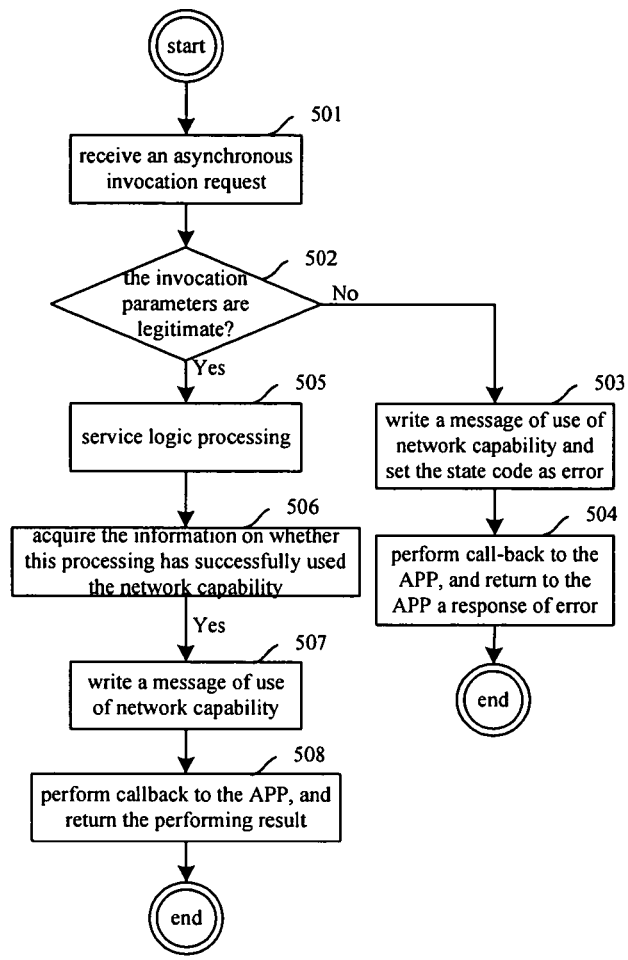
FIG. 5 is a flowchart for recording asynchronous use of network service capability in accordance with an embodiment of the present invention.

FIG. 5 is a flowchart for recording asynchronous use of network service capability in accordance with an embodiment of the present invention.

Step 501: A network server receives an asynchronous invocation request from an APP, where the request comprises an identity of the APP and invocation parameters.

Step 502: The network server acquires the identity of the APP and the invocation parameters from the invocation request, and validates whether the invocation parameters are legitimate, if yes, perform Step 505; otherwise, perform Step 503.

Step 503: Write a message of use of network service capability which includes state information as this service logic processing has failed to use the network service capability. The state information as this service logic processing has failed to use the network service capability is identified by a state code which also identifies cause of the failure. Here, the cause of the failure is that the invocation parameters are not legitimate.

Step 504: Return a message indicating abnormal to the APP, and end the procedure.

Step 505: Perform service logic processing. The specific procedure comprises: instructing the network function performing module which possesses network service capability corresponding to contents of the invocation request to implement network operation, and receiving the performing result returned from the network function performing module.

Step 506: Acquire the state information on whether this service logic processing has successfully used the network service capability according to the received performing result.

Step 507: Write a message of use of network service capability, which contains the state information as this service logic processing has succeeded in using the network service capability. Here, the state information on whether the service logic processing has successfully used the network service capability is identified by a state code, which is set hereby indicating success.

There are two methods for recording the state information on whether the service logic processing has successfully used the network service capability:

One is to decide whether the service logic processing is successful, if yes, record the state information as the service logic processing has succeeded in using the network service capability, otherwise, record the state information as the service logic processing has failed to use the network service capability; the other is to record the state information as the service logic processing has succeeded in using the network service capability as long as the service logic processing is finished, without considering whether the service logic processing is successful or not.

Step 508: Perform a callback to the APP, and notify the APP of the performing result. If the service logic processing is successful, it is indicated hereby that a correct result is returned; if the service logic processing fails, it is indicated hereby that an error is returned.

Figure 6:
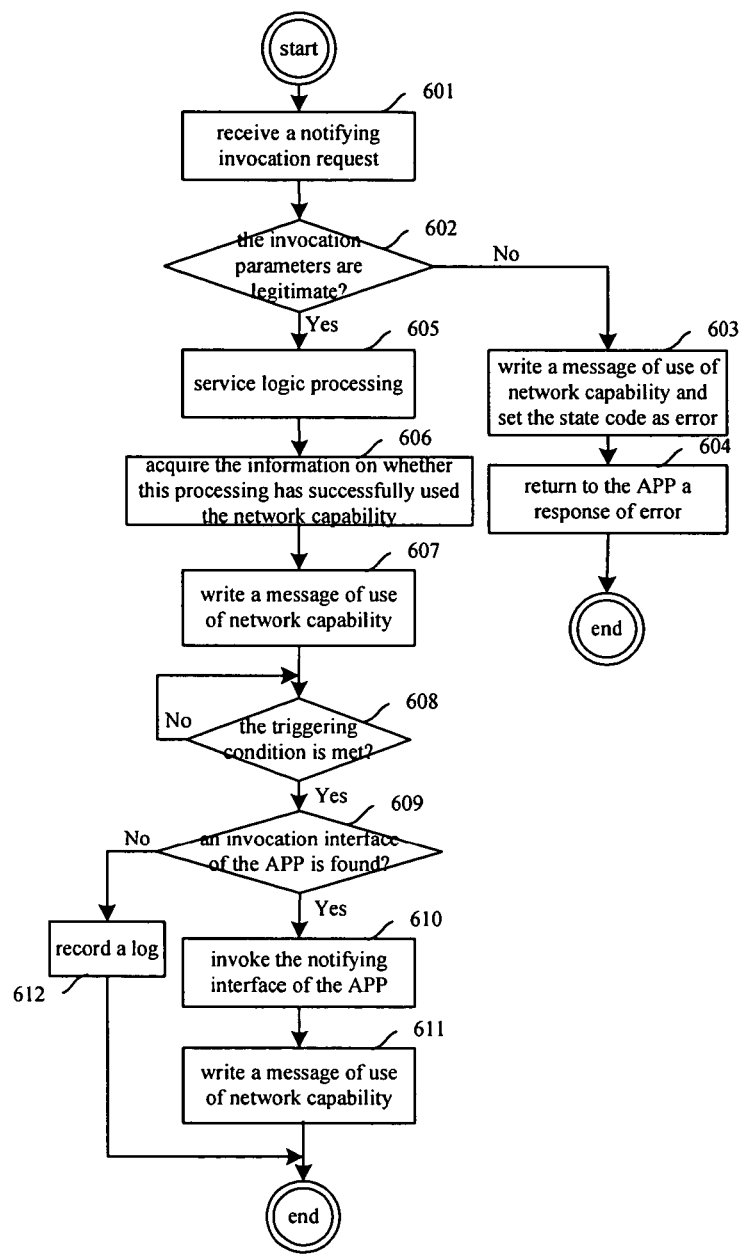
FIG. 6 is a flowchart for recording use of notifying capability of network in accordance with an embodiment of the present invention.

FIG. 6 is a flowchart for recording use of network notifying capability in accordance with an embodiment of the present invention.

Step 601: A network server receives a notifying invocation request from an APP, which contains an identity of the APP, invocation parameters, and information adopted to subscribe an event for the APP, i.e., a triggering condition for the network to issue a notice.

Steps 602~607 are the same as Steps 402~407, i.e., a notifying invocation request sent by the APP may be a synchronous invocation request. Of course, this notifying invocation request may be an asynchronous invocation request as well.

Step 608: Decide whether the triggering condition required by the subscription of a network event in the notifying invocation request is currently met, if yes, perform Step 609; otherwise, repeat Step 608.

Step 609: Decide whether a notifying interface of the APP is found, if yes, perform Step 610; otherwise, perform Step 612.

Step 610: Invoke the notifying interface of the APP, and notify the APP of the network event it has subscribed to.

Step 611: Write a message of use of network service capability, and end the procedure. The message of use of network service capability contains state information on whether this service logic processing has successfully used the network service capability.

There are two methods for recording the above state information on whether the service logic processing has successfully used the network service capability:

One is that the network server decides whether the information returned from this APP indicates normal after notifying the APP, if yes, record the state information as the service logic processing has succeeded in using the network service capability, otherwise, record the state information as the service logic processing has failed to use the network service capability; the other is to record the state information as the service logic processing has succeeded in using the network service capability after the network notifies the APP, without considering whether the information returned from the APP indicates normal or not.

Step 612: Record a log, and end the procedure.

As shown in FIG. 6, when recording the use of network notifying capability, Steps 601~607 may be skipped and the recording procedure directly starts from Step 608. Obviously, before performing Step 608, it is needed to carry out configuration according to functions of the network side, i.e., pre-configure triggering conditions for the network side to initiatively send a notifying message to the APP, and the triggering conditions are determined according to the functions of the network side. When a triggering condition for the APP is currently met, the network server, based on the pre-configured corresponding relation between the network event and an identity of the APP, acquires the identity of the APP corresponding to the received network event and the type information of the network service capability providing services for the APP, performs service logic processing, thereafter invokes a notifying interface of the APP, sends a notifying message to this APP, and records again a message of use of network service capability. For example, a function of notifying the transmission state of short message has been pre-configured at the network side, and this function does not require a subscription of a user. Every time the user sends a short message, a report about the receiving state will be obtained from the receiver, e.g., the information that the receiver has received or has not received the message. That is, some notifying functions require subscription in advance by an APP, e.g., daily news or weather forecast, while other notifying functions does not require subscription beforehand, and so long as such functions have been pre-configured on a network server, the network side will perform the notifying functions when a triggering condition is met. Which functions require subscription in advance for notifying services and which functions does not have such requirement can be configured freely according to specific demands.

In the performing process of any of the flowcharts shown in FIGS. 4, 5, and 6, the network server may further implement an operation of recording a log, the specific method of which is the same as the prior art, and no further description is hereby given.

The contents of the message of use of network service capability mentioned in FIGS. 4, 5, and 6, as well as their corresponding meanings are shown in Table 1.

TABLE 1

| No. | Field Name | Attribute | Meaning | Description |
|---|---|---|---|---|
| 1 | Serial number of a message | O | Serial number of a message of use of network service capability to differentiate messages | 22-digit number, comprising: submitting time of a message + property code of network service capability + incremental serial number, e.g., MMDDHHMISS (10 digits) + SCF_ID (6 digits) + serial number (6 digits), where the serial number is a 6-digit figure starting from zero and sequentially added with a step of 1. |
| 2 | Session ID | O | One session may include multiple uses of capability | Session ID is for identifying invocations of a set of interfaces during a session, which reflects multiple uses of original capabilities and may be used in identifying a compound capability |
| 3 | ID of an APP | M | Indicating the serial number of APP | Comprising an identity of an APP |
| 4 | APP priority ID | O | Identifying the priority of an APP | 0: normal (default) 1: high |
| 5 | ID of QoS level of an APP | O | providing the QoS level of a network service capability | 0: allowing delay (default) 1: low delay 2: no delay |
| 6 | Type of capability | M | Capability feature type | Capability abstracted from services which the network server is able to provide, with serial numbers, e.g., capabilities abstracted from Parlay/Parlay X 0: GCC generic call control 1: MPCC multi-party call control 2: MMCC multimedia call |

TABLE 1-continued

| No. | Field Name | Attribute | Meaning | Description |
|-----|------------|-----------|---------|-------------|
|     |            |           | control |             |
|     |            |           |         | 3: CCC conference call control |
|     |            |           |         | ... |
| 7 | Serial number of interface type | M | Identifying the type and name of an interface | E.g., 1: SuperviseCallReq 2: RouteReq 3: SendInfoReg |
| 8 | Serial number of capability server | O | Serial number of a server providing services | |
| 9 | Subscriber number 1 | O | End user number 1 of the service | Such as an involved party of an invocation, the receiver of a short message |
| 10 | Subscriber number 2 . . . N | O | End user number 2 . . . N of the service | |
| 11 | Starting time of a capability request | O | Starting time of a capability request | Format: YYYYMMDDHHMISS |
| 12 | Ending time of a capability request | O | Ending time of a capability request | Format: YYYYMMDDHHMISS |
| 13 | State code | O | Identifying the result of this logic processing, i.e., use of capability, is successful | 1 to 3-digit 000: success 001~999: specific error code |
| 14 | Initiator ID | O | Identifying an initiator of use of network service capability | 0: APP 1: network-side server |
| 15 | Charging mode | O | Charging mode of use of network service capability, which is acquired by configuration and is written in connection with APP | 0: free charge 1: charging per message 2: charging by monthly payment 3: reserved |
| 16 | End mark | O | Identifying the end of a record | e.g., carriage return, linefeed |

Refer to Table 1, an item which has a mark of M in the attribute column is essential in a message of use of network service capability, while an item with the attribute of O is optional. That is, a message of use of network service capability at least comprises an identity of the APP and type information of the network service capability providing services for the APP. A serial number and/or an end mark may be contained in the message, but they are not mandatory. Further, the message of use of network service capability may comprise: a current session identity (session ID) assigned for the current session which could be used as a correlator to associate several corresponding network usages, an APP priority identifier, an identifier of QoS level of the APP, one or more subscriber numbers which could jointly be used with the identity of the APP for measuring the use of the network service capability, starting time of a request and ending time of a request, an initiator ID and state information on whether this service logic processing has successfully used the network service capability. When it is needed to charge according to the message of use of network service capability, it will further comprise an identity of charging mode, and said identity of charging mode comprises an identity of free charge, an identity of charging per message, or an identity of charging by monthly payment.

Contents in the description column of Table 1, e.g., digits, formats, and sequences of time information as well as examples thereof, are only preferred embodiments, and practical applications are not limited to the contents hereby presented. The items of No. 3~No. 5 are basic attributive information of an APP; the items of No. 6~No. 8 are type information of a network service capability providing services for the APP; and the item of No. 15 is used only when a server is to perform charging management of the APP. Of course, the item of No. 15 could be set as a part of a charging matrix, and it may not be contained in this message. Also, if no charging management is to be made, the item of No. 15 may not be comprised in this message either. And if other managements are to be made, other item for representing the managements may be added into the above information.

The type of capability numbering No. 6 in Table 1 includes, without limitation, network service capability for a voice service, e.g., call routing, call supervising, voice playing, or acquiring more in-coming numbers; network service capability for a data service, e.g., sending a text message, sending a multimedia message, acquiring location information of a terminal, submitting a change of terminal location, and sending a USSD message; and network service capability for management, e.g., adding member to a group, deducting cost according to amount, reserving amount according to cost, prolonging time of cost reservation, configuring network QoS, and adding policy fields.

More descriptions are hereinafter given with reference to examples of practical applications.

Figure 7:
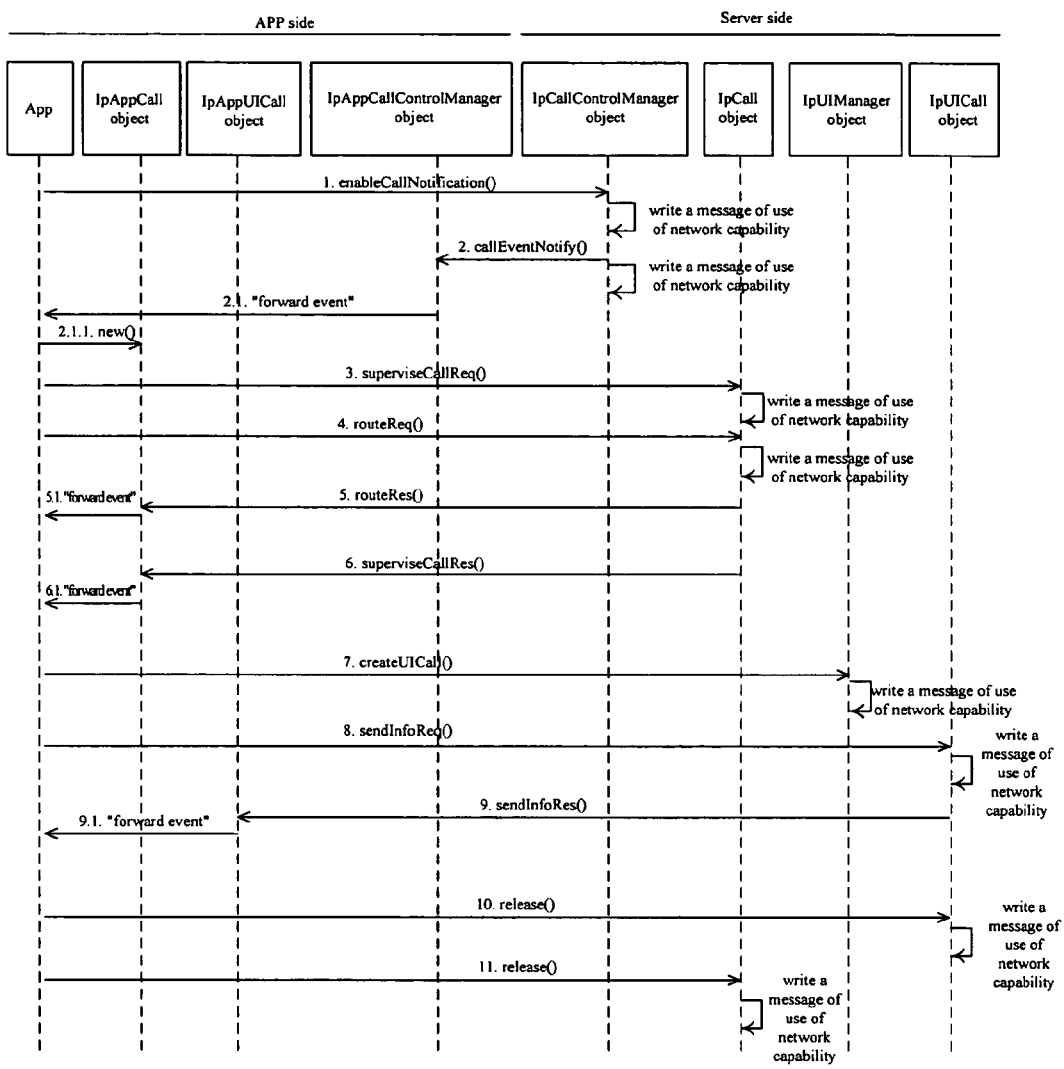
FIG. 7 shows an embodiment of recording the use of network service capability based on an API invocation.

FIG. 7 shows an embodiment of recording use of network service capability based on an API invocation. As known to all, the GCC SCF defined in the Parlay/OSA provides capability features associated with call control, which include capabilities such as creating a call object (createCall), routing a call (routeReq), supervising a call (superviseReq), de-assigning call control (deassignCall), releasing a call object (release), and notifying a call event (callEventNotify). The UI SCF provides capability features related with user interaction, which include capabilities such as creating a user interaction object (createUICall), sending information (sendInfoReq), sending and collecting information (sendInfoAndCollectReq), and recording (recordMessageReq).

Here, Step 1 manifests that an APP invokes an enableCallNotification to instruct the object of IpCallControlManager at the server side to enable the call notification function. As the enableCallnotification is a synchronous invocation, the object of IpCallControlManager records a message of use of network service capability, which indicates that the APP has used the network service capability once, after receiving the notification.

Step 2 manifests that the object of IpCallControlManager at the server side invokes the callEventNotify to notify the object of IpAppCallControlManager of the arrival of a call event. As the IpCallControlManager object server has sent a notifying message, the IpCallControlManager object of the server side records a message of use of network service capability after sending the notifying message, where the message of use of network service capability indicates that the APP has used the network service capability once. In Step 2.1, the object of IpAppCallControlManager at the APP side will send the received notifying message to the APP, and in Step 2.1.1, the APP will also return appropriate information after receiving the notifying message. However, whether Step 2.1 and Step 2.1.1 have been successfully performed or not, the object of IpAppCallControlManager will conduct a record because the APP has used network service capability once, and yet, whether to record the use of network service capability as success will depend on pre-configured principles.

Step 3 represents that the APP invokes the superviseCallReq to ask the IpCall object at the server side to supervise a call. As the superviseCallReq is an asynchronous invocation, the IpCall object at the server side records a message of use of network service capability, which indicates that the APP has used the network service capability once, after receiving the request.

Step 4 manifests that the APP invokes the routeReq to ask the IpCall object at the server side to carry out call routing. As the routeReq is an asynchronous invocation, the IpCall object at the server side records a message of use of network service capability after receiving the request for indicating that the APP has used the network service capability once.

Step 5 demonstrates that the IpCall object invokes the routeRes to return a message of successful routing to the IpAppCall object at the APP side. In Step 5.1, the IpAppCallControlManager object at the APP side will notify the APP of the received notifying message.

Step 6 shows that the IpCall object at the server side invokes the superviseCallRes to report a call supervising information to the IpAppCall object at the APP side. In Step 6.1, the IpCallControlManager at the APP side will notify the APP of the received notifying message.

As seen from the above, whether or not Steps 5, 5.1, 6, 6.1 have been performed successfully, the server side will record a message because the APP has used network service capability once. However, whether to record a successful use of network service capability by this processing depends on pre-configured principles.

Step 7 manifests that the APP invokes the createUICall to ask the IpUIManager object to create a call-related user-interaction object. As this createUIManager is a synchronous invocation, the object of IpUIManager at the server side records a message of use of network service capability indicating one use of network service capability by the APP after receiving the request.

Step 8 means that the APP invokes the sendInfoReq to ask the object of IpUICall at the server side to send a message to a user. As this sendInfoReq is an asynchronous invocation, the object of IpUICall at the server side records a message of use of network service capability indicating one use of network service capability by the APP after receiving the request.

Step 9 means the object of IpUICall at the server side reports the transmission state to the object of IpAppUICall at the APP side via the sendinfoRes. In Step 9.1, the object of IpAppUICall at the APP side notifies the APP of the received notifying message.

Step 10 means that the APP invokes a release procedure to instruct the IpUICall object to release the call-related user-interaction object. As the invocation of release procedure is a synchronous invocation, the IpUICall object at the server side records a message of use of network service capability indicating one use of network service capability by the APP after receiving the release message.

Step 11 means that the APP invokes a release procedure to instruct the IpCall object to release a call object. As the invocation of release procedure is a synchronous invocation, the IpCall object at the server side records a message of use of network service capability indicating one use of network service capability by the APP after receiving the release message.

As seen from the above, in practical applications, as long as an APP has used the capability of a server at the network side once, the server will record a message. In the embodiment shown as FIG. 7, multiple API invocations by the IpCall object employ a uniform session ID, and multiple API invocations by the IpUICall object uniformly use another session ID.

Figure 8:
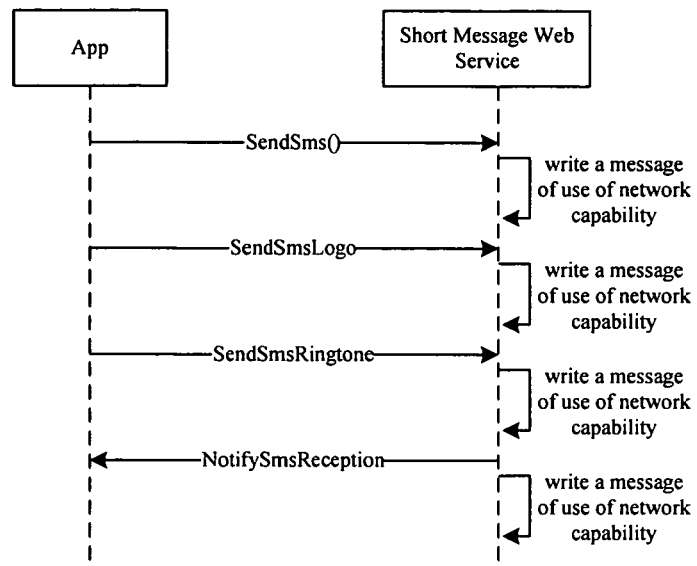
FIG. 8 shows another embodiment of recording the use of network service capability based on an API invocation.

FIG. 8 shows another embodiment of recording use of network service capability based on API invocation. In Parlay X Web Service, Soap messages are used for the interworking between an APP and a server, and the server provides API invocations in the mode of Web Service. In this embodiment, the SendSms, the SendSmsLogo, and the SendSmsRingtone are all synchronous use of the server capability by the APP, representing use of the capability of sending a short message of text, use of the capability of sending a Logo message with pictures, and use of the capability of sending a short message with a ring tone, respectively; the notifySmsReception is the use of the notifying capability of the server by the APP, which acquires from the server the short message sent to the APP.

Although the application scenarios shown in FIG. 7 and FIG. 8 are based on the API invocations defined by Parlay/OSA, the methods in accordance with the present invention are applicable to invocations based on non-API interfaces as well.

Figure 9:
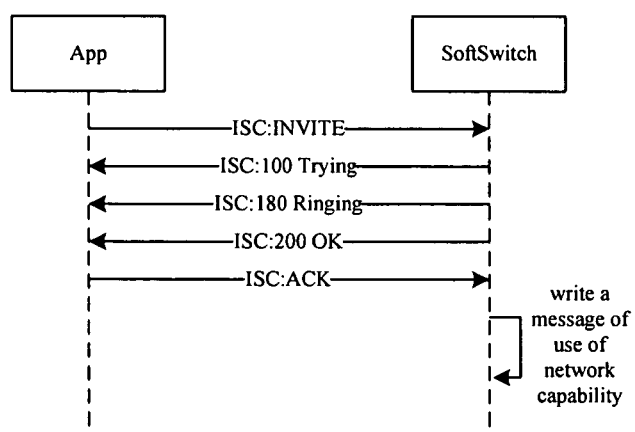
FIG. 9 shows an embodiment of recording the use of network service capability that implements invocation based on an IP multimedia Subsystem Service Control (ISC) interface.

FIG. 9 shows an embodiment of recording use of network service capability for invocations based on ISC interfaces. In this embodiment, the APP conducts interaction with a SoftSwitch.

As shown in FIG. 9, from the INVITE message to the ACK message, the APP has used the session connecting capability of the network once. Therefore, after receiving the ACK message, the SoftSwitch writes a message of use of network service capability.

Figure 10:
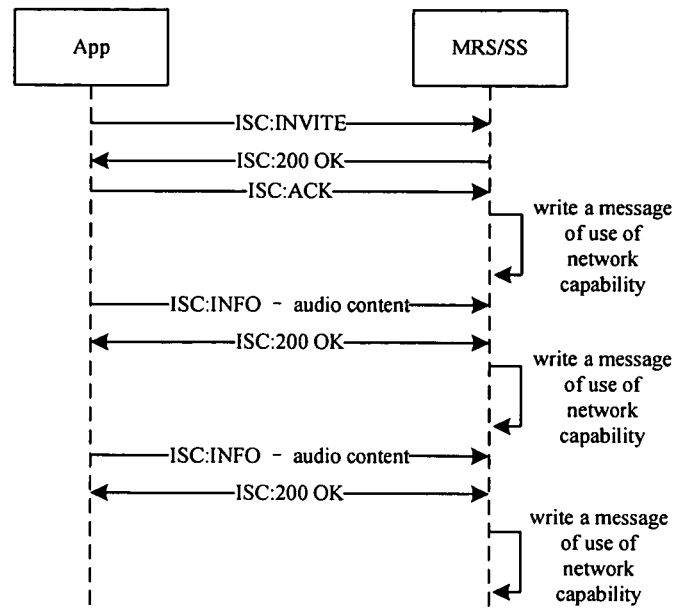
FIG. 10 shows another embodiment of recording the use of network service capability that implements invocation based on an ISC interface.

FIG. 10 shows another embodiment of recording use of network service capability for invocations based on ISC interfaces. In this embodiment, the APP conducts interaction with an MRS/SS.

As shown in FIG. 10, from the INVITE message to the ACK message, the APP has used the session connecting capability of the network once, and after the setup of session connection, the APP has used the voice playing capability twice. Therefore, the APP has altogether used the network service capability three times.

Figure 11:
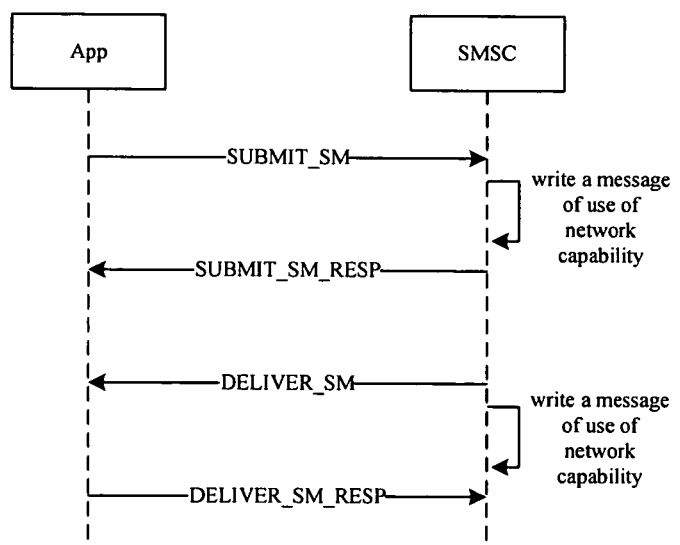
FIG. 11 shows yet another embodiment of recording the use of network service capability that implements invocation based on an ISC interface.

FIG. 11 shows yet another embodiment of recording use of network service capability for invocations based on ISC interfaces. In this embodiment, the APP conducts interaction with a Short Message Service Center (SMSC).

Here, the SUBMIT_SM has used the short message sending capability of SMSC; and the DELIVER_SM has used the short message notifying capability of SMSC, e.g., a user sends a short message to an APP, or an APP receives a state report of short message.

A plurality of messages of use of network service capability form a list of use of network service capability. After recording the list of use of network service capability by the APP, the network server may perform management on the APP. An example of perform charging management is hereinafter given to specifically describe the process of managing an APP by utilizing a list of use of network service capability.

Figure 12:
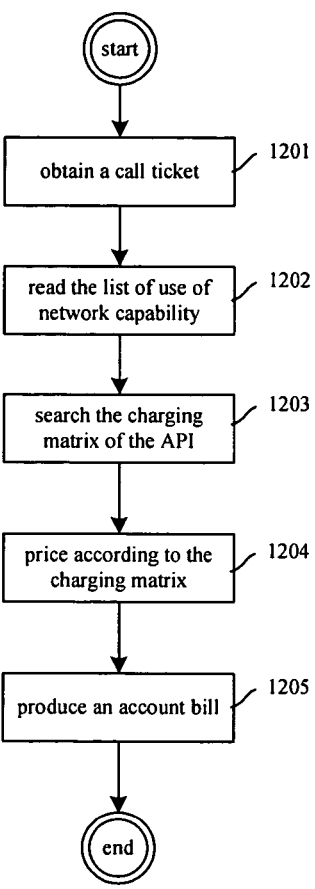
FIG. 12 is a flowchart of managing APPs based on use of network service capability by the APPs in accordance with an embodiment of the present invention.

FIG. 12 is a flowchart of managing an APP based on the use of network service capability by the APP in accordance with an embodiment of the present invention. A network usage list processing module is configured in advance in the network. This module has functions similar to a subscriber CDR processing module except that the network usage list processing module is for pricing and charging APPs. In addition, a charging matrix of use of network service capability is configured. This charging matrix could contain such information as number of times and time duration of invoking interfaces, and charging rates and/or discounts of different interfaces. Furthermore, this charging matrix of use of network service capability may be stored inside the network usage list processing module, or inside other modules, as long as the network usage list processing module is able to acquire this charging matrix during applications.

Step 1201: The network usage list processing module acquires a list of use of network service capability of the APP.

Step 1202: Read items of each message of use of network service capability.

Step 1203: Acquire the pre-configured charging matrix of use of network service capability.

Step 1204: Price the acquired message of use of network service capability according to the charging matrix of use of network service capability. In the pricing process, it is possible to price each message of use of network service capability, or price a combination of multiple messages of use of network service capability, where the specific pricing policy depends on specific demands.

Step 1205: Produce a charging bill for the APP.

Here is an example of FIG. 12 on how the messages contained in the list of use of network service capability are adopted for generating a charging bill according to a charging matrix. The charging matrix could be set beforehand with reference to policies such as price for each message, or price for a combination of multiple messages associated with session IDs, or price according to the message and the amount of users, or if the number of times of invocating an interface exceeds 10000, a discount is provided, etc. When the charging matrix is set as price for each message, a charging bill for the use of the SendBulkSMS interface is the same as the use of the SendSMS interface. When the charging matrix is set as price according to the message and the amount of users, a charging bill for the use of the SendBulkSMS interface is generated on taking the amount of users into account. Thus, the charging bill of the use of a SendSMS interface is different from that of a SendBulkSMS interface, because the SendBulkSMS causes several network operations simultaneously while the SendSMS may only cause a network operation. When pricing Message1 to Message 7 which have a same session ID, since it has been designated that applying a charging policy for pricing Message1 to Message 5, while applying another charging policy for pricing Message 6 and Message 7, the charging bill for the use of Message1 to Message 5 is different from that of Message 6 and Message 7. That is, messages with the same session ID could be priced freely according to a preset policy.

As seen from the above, this invention provides a method for recording use of network service capability by APPs with a flexible and configurable granularity. And it is possible to conduct management such as charging and performing statistics based on the recorded use of network service capability.

To sum up, the foregoing only describes preferred embodiments of the invention, and is not for limiting the protection scope thereof.

The invention claimed is:

1. In a network server which provides an interface to a service provider so that an application (APP) of the service provider can use network service of the network server through invocating the interface, a method for producing a charging account for the APP, which uses the network service of the network server, of the service provider, comprising the steps of:

receiving, by the network server via an Application Programming Interface (API), an invocation request carrying both an identity of the APP of the service provider and invocation parameters from the APP of the service provider;

obtaining, by the network server, both the identity of the APP and invocation parameters from the invocation request, determining, by the network server, type information of the network service capability requested by the APP according to the invocation request received from the APP of the service provider;

based on the invocation request received from the APP of the service provider, recording, by the network server, an item of network service capability used by the APP of the service provider, which at least comprises both the identity of the APP of the service provider and the type information of the network service capability used by the APP of the service provider;

based on the recorded item of network service capability, and pricing, by the network server, the item of network service capability used by the APP of the service provider according to a charging matrix of network service capability configured in the network server, and producing a charging account for the APP of the service provider.

2. The method of claim 1, wherein said invocation request comprises a synchronous invocation request based on the API interface; and after recording by the network server the item of network service capability used by the APP of the service provider, the method further comprises: performing, by the network server, a network operation according to invocation request, and returning, by the network server, a response of a performed result to the APP of the service provider.

3. The method of claim 1, wherein
said invocation request comprises an asynchronous invocation request based on the API interface; and
after recording by the network server the item of network service capability used by the APP of the service provider, the method further comprises: performing, by the network server, a network operation according to invocation request, and performing, by the network server, call-back on the APP for notifying the APP of a performed result.

4. The method of claim 1, wherein
said invocation request comprises a notifying invocation request based on the API interface, which further comprises information for subscribing a network event; and
after recording by the network server the item of network service capability used by the APP of the service provider, the method further comprises:
deciding, by the network server, whether a triggering condition required by the subscription of a network event in the notifying invocation request is met, if not, conducting no processing; if yes, invoking a notifying interface of the APP, notifying the APP of the network event subscribed thereof, and recording another item of network service capability.

5. The method of claim 2, 3 or 4,
said invocation request based on the API interface is a local invocation or a remote invocation.

6. The method of claim 1, further comprising:
setting triggering conditions, which are determined in accordance with functions of the network server, for the network server to initiatively send a notifying message to the APP of the service provider; and
when a triggering condition of the APP is currently met, based on a preset corresponding relation between a network event and the identity of the APP, obtaining the identity of the APP corresponding to the received network event and the type information of the network service capability providing services for the APP, implementing service logic processing, invoking a notifying interface of the APP to send a notifying message to the APP, and recording, by the network server, a message of network service capability used by the APP of the service provider.

7. The method of claim 1, wherein said message of network service capability further comprises: a serial number of the message, an end mark of the message, an APP priority identifier, an identifier of QoS level of the APP, one or more subscriber numbers, starting time of the request and ending time of the request, an initiator ID and state information on whether the APP has successfully used the network service capability.

8. The method of claim 7, wherein
said serial number of the message is constituted jointly by submitting time of the message, a property code of network service capability, and a serial number;
said type information of the network service capability providing services for the APP comprises: a number of the capability type and a type of the interface used by the APP; said capability type comprises network service capability for voice services, network service capability for data services, or network service capability for management;
said type information of the network service capability providing services for the APP further comprises a serial number of a capability server.

9. The method of claim 1, wherein said list of network service capability is in a form of a file or a database.

10. The method of claim 1, wherein,
when used for charging, said item of network service capability further comprises an identity of charging mode and a current session identity assigned for the current session by an object providing capability services; said identity of charging mode is an identity of free charge, an identity of charging per message, or an identity of charging by monthly payment.

11. In a network server which provides interface to a service provider so that an application (APP) of the service provider can use network service of the network server through invocating the interface, a method for producing a charging account for the APP, comprising the steps of:
configuring, by the network server, triggering conditions, which are determined according to functions of a network side, for the network side to initiatively send a notifying message to the APP of the service provider; and
when a triggering condition of the APP is currently met, obtaining, by the network server, the identity of the APP corresponding to a received network event as well as type information of a network service capability providing services for the APP based on a pre-configured corresponding relation between a network event and an identity of the APP, performing service logic processing, invoking a notifying interface of the APP, sending a notifying message to the APP, and recording based on the invocation request received from the APP of the service provider, by the network server, a item of network service capability used by the APP of the service provider;
said the item of network service capability at least comprises both the identity of the APP of the service provider and the type information of the network service capability used by the APP of the service provider;
pricing based on the recorded item of network service capability, by the network server, the item of network service capability according to the charging matrix of network service capability configured in the network server, and producing a charging account for the APP of the service provider.

12. The method of claim 11, wherein said message of network service capability used by the APP of the service provider further comprises: a serial number of the message, an end mark of the message, an APP priority identifier, an identifier of QoS level of the APP, one or more subscriber numbers, starting time of the request and ending time of the request, an initiator ID and state information on whether this service logic processing has successfully used the network service capability; and
said method for recording said state information on whether this service logic processing has successfully used the network service capability comprises:
after sending a notifying message to the APP, deciding by the network server whether the returned message from the APP indicates normal, if yes, recording the state information as this service logic processing has succeeded in using the network service capability, otherwise, recording the state information as this service logic processing has failed to use the network service capability; or directly recording the state information as this service logic processing has succeeded in using the network service capability after the network server sends the notifying message to the APP;

wherein said state information on whether this service logic processing has successfully used the network service capability is identified by a state code.

13. A computer program product for use in a network server, which produces a charging account for an application (APP) of a service provider, wherein the network server provides an interface to the service provider so that the APP of the service provide can use network service of the network server through invocating the interface, the computer program product comprising computer executable instructions stored on a non-transitory storage medium and that when executed by a processor of the mobile terminal cause it to perform the following:

receiving, by the network server via an Application Programming Interface (API), an invocation request carrying both an identity of the APP of the service provider and invocation parameters from the APP of the service provider;

obtaining, by the network server, both the identity of the APP and invocation parameters from the invocation request, determining, by the network server, type information of the network service capability requested by the APP according to the invocation request received from the APP of the service provider;

based on the invocation request received from the APP of the service provider, recording, by the network server, an item of network service capability used by the APP of the service provider, which at least comprises both the identity of the APP of the service provider and the type information of the network service capability used by the APP of the service provider;

based on the recorded item of network service capability, and pricing, by the network server, the item of network service capability used by the APP of the service provider according to a charging matrix of network service capability configured in the network server, and producing a charging account for the APP of the service provider.

\* \* \* \* \*

UNITED STATES PATENT AND TRADEMARK OFFICE
CERTIFICATE OF CORRECTION

| | | |
|---|---|---|
| PATENT NO. | : 8,612,568 B2 | Page 1 of 1 |
| APPLICATION NO. | : 11/449598 | |
| DATED | : December 17, 2013 | |
| INVENTOR(S) | : Linyi Tian | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1831 days.

Signed and Sealed this
Twenty-first Day of April, 2015

Michelle K. Lee
*Director of the United States Patent and Trademark Office*